United States Patent [19]

Warwick et al.

[11] 4,433,757

[45] Feb. 28, 1984

[54] DISC BRAKE LINING RETAINER AND WEAR WARNING ARRANGEMENT

[75] Inventors: Edward H. Warwick, Englewood; Donald L. Parker, Middletown, both of Ohio

[73] Assignee: General Motors Corporation, Detroit, Mich.

[21] Appl. No.: 353,414

[22] Filed: Mar. 1, 1982

[51] Int. Cl.³ .............................................. F16D 66/00
[52] U.S. Cl. ................................. 188/1.11; 188/72.4; 188/73.32
[58] Field of Search .................... 188/72.3, 72.4, 72.5, 188/72.6, 73.1, 73.2, 73.31, 73.32, 73.33, 73.34, 73.43, 73.44, 73.45, 73.38, 1.11, 370, 369, 250 B, 250 G, 250 F, 250 R

[56] References Cited

U.S. PATENT DOCUMENTS

| | | | |
|---|---|---|---|
| 2,531,341 | 11/1950 | Meador, Jr. | 188/72.4 X |
| 4,124,105 | 11/1978 | Maehara | 188/1.11 |
| 4,311,214 | 1/1982 | Haraikawa et al. | 188/1.11 |

Primary Examiner—Douglas C. Butler
Attorney, Agent, or Firm—D. D. McGraw

[57] ABSTRACT

The support for the outboard disc brake lining is a section of the caliper, and no shoe is used. The lining has a boss which fits into a recess formed in the caliper housing. The boss has sufficient shear area to transmit brake torque to the caliper. Center holes in the lining provide a location for a clip to be installed through the outboard caliper section. The clip keeps the lining away from the disc in the rest position and may also function as a lining wear sensor. The results include lighter weight and more usable lining.

1 Claim, 4 Drawing Figures

DISC BRAKE LINING RETAINER AND WEAR WARNING ARRANGEMENT

The invention relates to a disc brake arrangement which is lighter in weight than similar capacity brakes currently on the automotive market. The arrangement also provides for additional usable brake lining compared to brake shoe assembly arrangements commonly used. The caliper housing has a light weight cylinder which is attached to one of the caliper legs by screw threads. More particularly, the outboard brake lining is removably mounted directly on to the outboard caliper leg, eliminating a brake shoe backing plate. This permits thicker lining material in the same space, and reduces the weight since the metallic backing plate normally used weighs more than the lining material and clip used in practicing the invention. The clip used to hold the outboard lining material on the outboard caliper leg is one feature of the invention. It is readily removable and replaceable, and incorporates a lining wear warning element.

IN THE DRAWINGS

Figure 1:
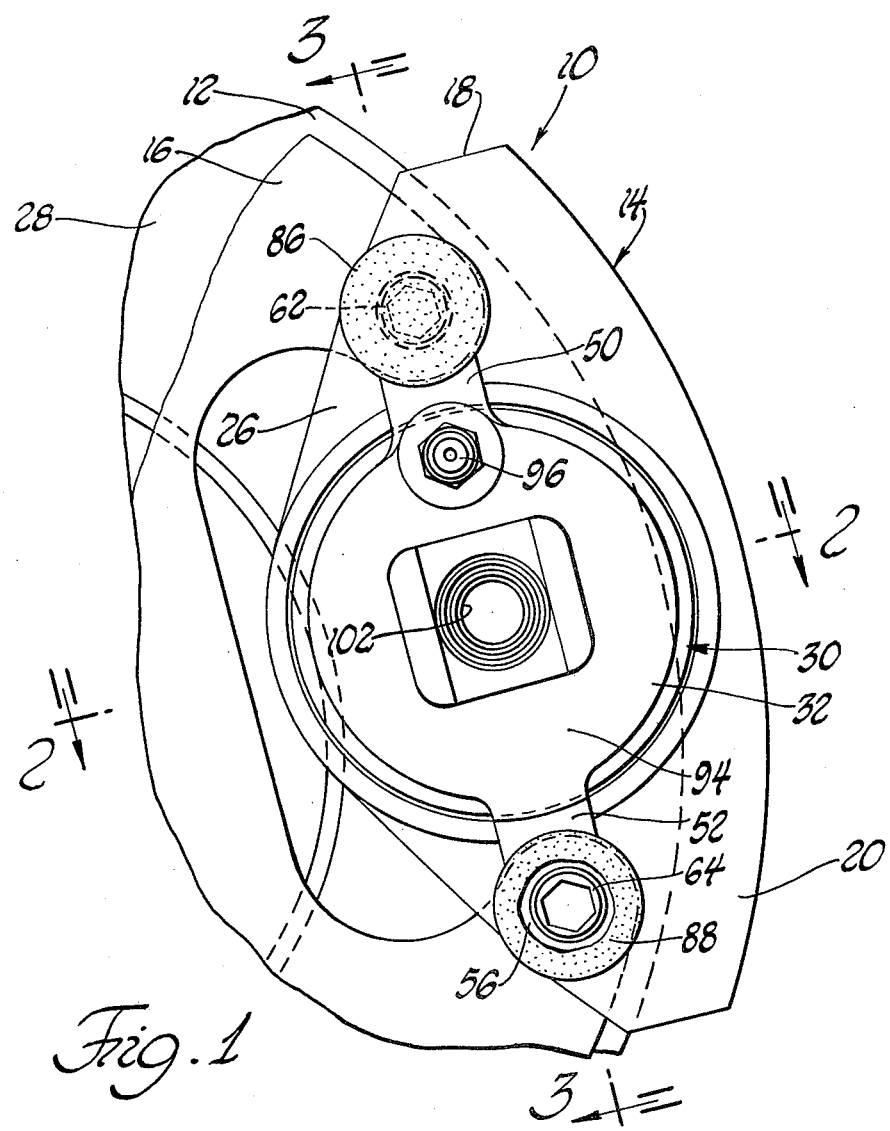
FIG. 1 is an elevation view of a disc brake assembly embodying the invention, parts being broken away.

The invention is closely related to the disc brake caliper assembly disclosed and claimed in U.S. Application Ser. No. 353,530 filed Mar. 1, 1982.

The disc brake assembly 10 is illustrated as being generally of a type in current production on automotive vehicles, with modifications embodying the invention. The assembly 10 includes a rotatable disc 12 to be braked, a caliper assembly 14, and a mounting bracket 16 on which the caliper assembly is slidably mounted. Braking torque is transmitted from the caliper assembly through the mounting bracket to a fixed portion of the vehicle.

The caliper assembly 14 includes a caliper 18 generally formed to provide a bridge section 20 extending over the outer periphery of an arcuate portion of disc 12, an outboard caliper leg 22 extending along the outboard disc surface 24 in spaced relation thereto, and an inboard caliper leg 26 extending along the inboard disc surface 28 in spaced relation thereto. A hydraulic actuating cylinder assembly 30 includes arrangements for slidably mounting the caliper assembly 14 on the mounting bracket 16. Assembly 30 includes a housing 32 having a cylinder 34 formed therein. The outboard end of housing 32 has external threads 36 formed thereon and threaded into mating internal threads 38 formed in an opening 40 in the inboard caliper leg 26. A piston assembly 42 is reciprocably received in cylinder 34. It is more particularly described in the U.S. Patent Application noted above, and the disclosure of that application is incorporated herein by reference.

Housing 32 has mounting arms 50 and 52 extending therefrom in diametrically opposite directions and generally parallel to disc 12 and mounting bracket 16. The outer ends of these arms are formed as bosses 54 and 56 through which bores 58 and 60 are respectively formed. These bores are axially parallel to the axis of rotation of disc 12. Mounting pins 62 and 64 are respectively received through bores 58 and 60. The outboard ends 66 and 68 of the pins are threaded into threaded openings 70 and 72 formed through mounting bracket 16. The pins also freely extend through openings 74 and 76 formed in the inboard caliper leg 26 so that the caliper leg does not contact the pins. Suitable retracting and adjusting seals 78 and 80 are located in bore 58 and similar seals 82 and 84 are located in bore 60. The grooves in which these seals are located permit adjusting and retracting action on the pins 62 and 64, as is known in the art. Outer boots 86 and 88 and inner boots 90 and 92 are fitted over the ends of bores 58 and 60 and protect the sliding surfaces of the pins and bores against contamination.

The inboard end of cylinder 34 is closed by end wall 94. Bleeder valve 96 is fitted at a suitable location in the end wall so that the bleeder valve is positioned at the top of the pressure chamber 100, located in cylinder 34 adjacent end wall 94, when the brake is installed on a vehicle. An inlet 102 is formed through end wall 94 and provides a suitable connection for delivery of hydraulic brake fluid to the chamber 100 when the brake is actuated.

The outboard caliper leg 22 is provided with a recess 122 on the side thereof facing disc surface 24, and the leg surface 124 into which recess 122 is formed is shaped to receive the outboard brake lining 126 in substantially full surface engagement with the outer surface 128 of the lining 126. Lining 126 has a button or boss 127 which fits into recess 122. No backing plate or brake shoe is provided, the outboard lining 126 being mounted directly on the caliper leg 22 so that the lining friction braking surface 130 is in position for braking engagement with disc surface 24. Spaced holes 132 and 134 are formed through the bottom wall 136 of recess 122 and open into an outwardly extending recess 138 formed in the caliper leg 22. Brake lining 126 has a recess 140 formed through its friction braking surface 130 in alignment with boss 127 so that holes 142 and 144 formed in the bottom wall 146 of recess 140 and through boss 127 are in alignment with holes 132 and 134. A generally U-shaped clip 148 is inserted through the recess 140 and the aligned holes 142, 132 and 144, 134. The clip legs 150 and 152 are bent to engage the bottom surface 154 of recess 138 to hold lining 126 in position while permitting removal and replacement of the lining as necessary.

Figure 2:
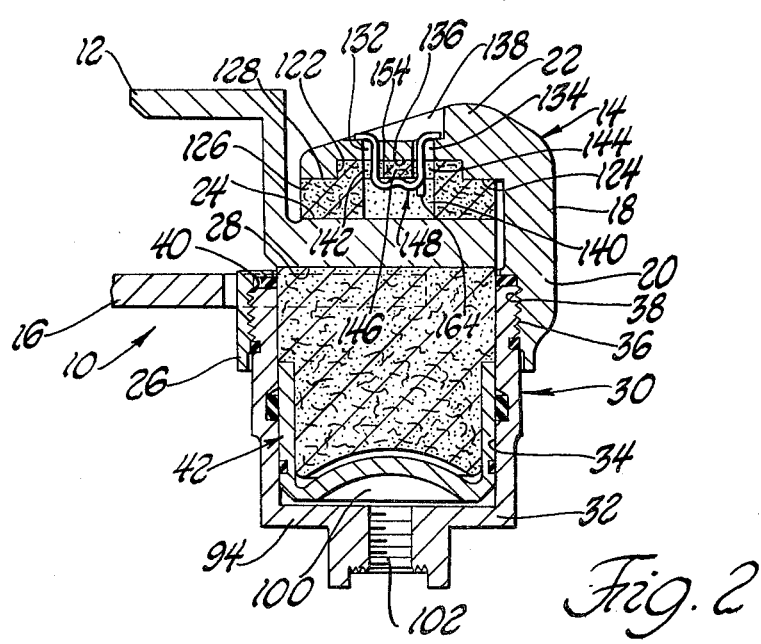
FIG. 2 is a cross section view of the brake assembly of FIG. 1 taken in the direction of arrows 2—2 of that Figure.
Figure 3:
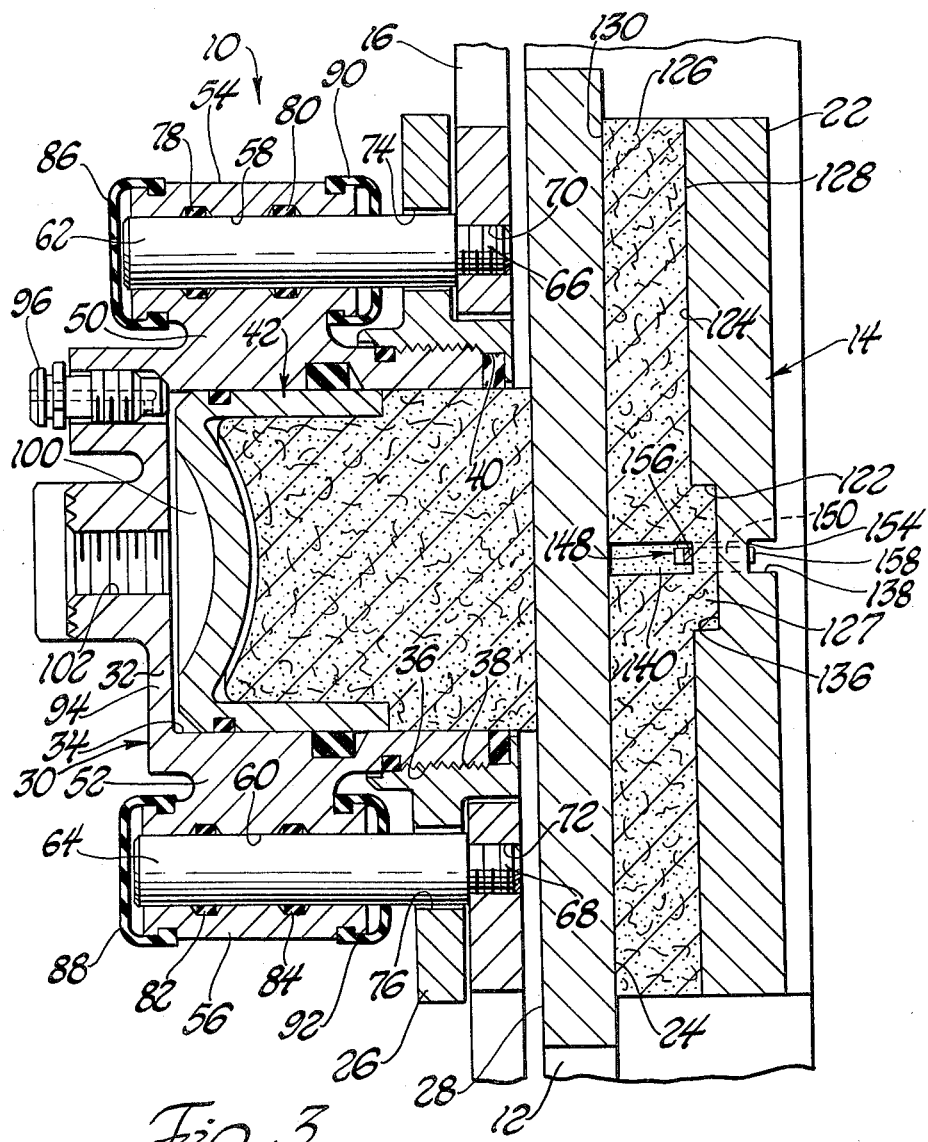
FIG. 3 is a cross section view, with parts broken away, of the disc brake assembly of FIG. 1 taken in the direction of arrows 3—3 of that Figure.
Figure 4:
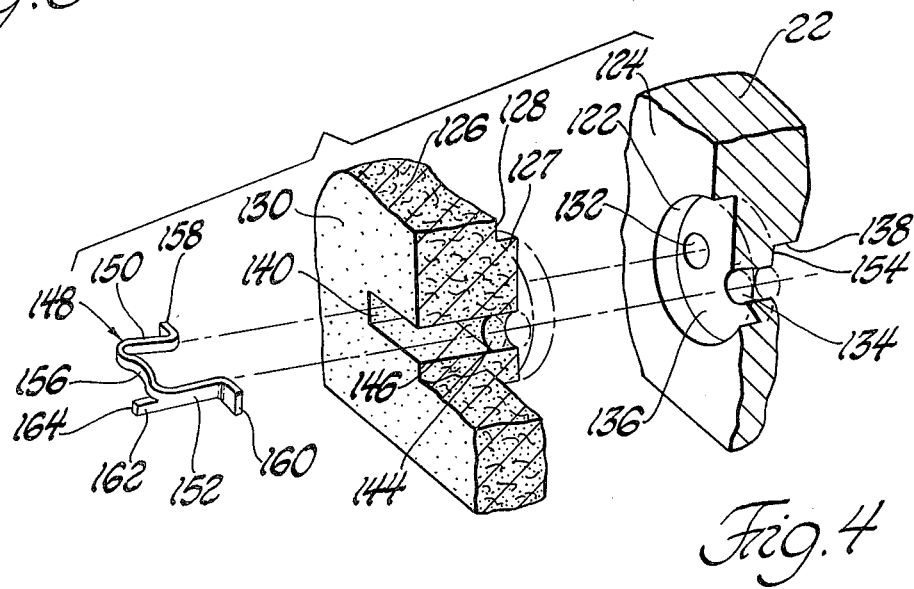
FIG. 4 is an exploded perspective view illustrating the assembly relationship of the clip, lining and outboard caliper leg of the assembly of FIG. 1, with parts broken away and in section.

The clip 148 is shown in greater detail in FIG. 4. The legs 150 and 152 are joined by a bridge 156 which is preferably reversely bent to provide a spring action with the center portion of the bridge engaging the recess bottom wall 146. The outer ends 158 and 160 of legs 150 and 152 are bent outwardly to engage bottom surface 154. The clip thus is spring loaded to hold it in place. A projection or tab 162 is formed as an extension of a part of clip leg 152, extending generally perpendicular to bridge 156. When the clip 148 and the lining 126 are installed, as shown in FIGS. 2 and 3, the end 164 of tab 162 projects slightly inboard of the plane defined by surfaces 124 and 128 so that when the lining 126 is worn to the extent that it should be replaced, the tab end rubs against the disc surface 24 while the brake assembly is actuated, creating a noise alerting the brake operator. The operator can then have the brake linings replaced before they have worn so much as to possibly result in damage to the disc and/or other parts of the disc brake assembly.

The construction herein disclosed and claimed provides a light weight disc brake caliper assembly by eliminating the outboard brake shoe assembly backing plate. It also results in having additional lining material available without increasing caliper exterior dimensions, increasing the time between lining replacements. The worn outboard lining may be readily removed and replaced, and the retaining clip also functions as a lining wear warning device.

The embodiments of the invention in which an exclusive property or privilege is claimed are defined as follows:

1. In a disc brake caliper having a caliper leg on one side of a disc to be braked and a friction bracking element mounted on said leg for selective friction braking engagement with the disc one side, the improvement comprising:

said friction braking element consisting solely of friction brake lining material having a friction braking surface facing the disc one side and a caliper leg mounting surface facing and in surface engagement relation with said caliper leg, and at least one boss integrally formed therewith and extending outwardly of said mounting surface;

said caliper leg having at least one recess formed therein receiving said at least one boss therein in mating relation with the side wall of said boss engaging the side wall of said recess and being of sufficient area to transmit brake torque therethrough;

and retaining means holding said friction braking element on said caliper leg in position for friction braking engagement with the disc one side and permitting ready removal and replacement of said friction braking element as needed, said retaining means comprising a spring clip located within aligned openings in said boss and the bottom wall of said caliper leg recess and having a spring portion and a securing portion spring loaded by said spring portion to continually urge said boss into full mating relation with said caliper leg recess, and having a tab formed to extend toward the disc to engage the disc only upon a predetermined amount of lining material wear and only during brake actuation to generate a lining wear warning noise.

* * * * *